United States Patent
Doering et al.

(10) Patent No.: US 9,358,974 B2
(45) Date of Patent: Jun. 7, 2016

(54) METHOD AND SYSTEM FOR ADJUSTING HYBRID VEHICLE DRIVELINE TORQUE

(71) Applicant: Ford Global Technologies, LLC, Dearborn, MI (US)

(72) Inventors: Jeffrey Allen Doering, Canton, MI (US); Alex O'Connor Gibson, Ann Arbor, MI (US); Dennis Craig Reed, Dexter, MI (US); David Oshinsky, Trenton, MI (US); Adam Nathan Banker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 684 days.

(21) Appl. No.: 13/708,807

(22) Filed: Dec. 7, 2012

(65) Prior Publication Data

US 2014/0162838 A1    Jun. 12, 2014

(51) Int. Cl.
*B60W 20/00* (2006.01)
*B60K 6/38* (2007.10)
*B60W 10/02* (2006.01)
*B60W 10/06* (2006.01)
*B60W 10/08* (2006.01)
*B60K 6/48* (2007.10)
*B60W 50/00* (2006.01)

(52) U.S. Cl.
CPC ............... *B60W 20/40* (2013.01); *B60K 6/38* (2013.01); *B60W 10/02* (2013.01); *B60W 10/023* (2013.01); *B60W 10/026* (2013.01); *B60W 10/06* (2013.01); *B60W 10/08* (2013.01); *B60W 20/10* (2013.01); *B60K 2006/4825* (2013.01); *B60W 2050/0008* (2013.01); *B60W 2510/0283* (2013.01); *B60W 2510/1015* (2013.01); *B60W 2540/10* (2013.01); *B60W 2710/028* (2013.01); *B60W 2710/0666* (2013.01); *B60W 2710/083* (2013.01); *B60W 2710/105* (2013.01); *B60W 2710/1011* (2013.01); *B60Y 2400/426* (2013.01); *Y02T 10/6252* (2013.01); *Y02T 10/6286* (2013.01); *Y10T 477/23* (2015.01); *Y10T 477/26* (2015.01)

(58) Field of Classification Search
CPC ... B60W 10/023; B60W 10/06; B60W 10/08; B60W 20/10; B60W 2510/1015; B60W 2710/0666; B60W 2710/083; B60K 2006/4825; Y10T 477/26; Y10T 477/633; Y10T 477/6333

See application file for complete search history.

(56) References Cited

U.S. PATENT DOCUMENTS

| | | | |
|---|---|---|---|
| 7,024,299 B2 | 4/2006 | Hubbard et al. | |
| 7,090,613 B2 | 8/2006 | Heap et al. | |
| 7,264,570 B2 | 9/2007 | Heap et al. | |
| 7,305,873 B2 | 12/2007 | Hubbard et al. | |
| 2008/0196954 A1* | 8/2008 | Soliman et al. | 180/65.2 |
| 2013/0296116 A1* | 11/2013 | Dai et al. | 477/5 |

OTHER PUBLICATIONS

Anonymous, "Method of Detecting Engine Combustion Degradation in a HEV," IPCOM No. 000064093, Published Feb. 18, 2005, 2 pages.

* cited by examiner

*Primary Examiner* — Huan Le
(74) *Attorney, Agent, or Firm* — David Kelley; Alleman Hall McCoy Russell & Tuttle LLP (57) ABSTRACT

Methods and systems for improving operation of a hybrid vehicle are presented. In one example, an engine torque estimate may be adapted in response to a torque converter impeller speed error. The methods and systems may reduce the possibility of driveline torque disturbances.

13 Claims, 5 Drawing Sheets

METHOD AND SYSTEM FOR ADJUSTING HYBRID VEHICLE DRIVELINE TORQUE

BACKGROUND AND SUMMARY

In hybrid vehicle designs, vehicle transmission input torque may be supplied as a sum of engine torque and an electric motor torque dependent on vehicle operation conditions. As an example, during initial vehicle acceleration, driveline torque to a transmission impeller may be supplied almost completely by the motor, and then motor torque may be reduced as increased engine torque becomes available. In this way, engine torque and motor torque can be varied while providing the desired demand torque. However, if there are errors in estimated engine torque and/or motor torque, the driver may notice a change in vehicle acceleration as the ratio of engine torque to motor torque changes. Therefore, it may be desirable to accurately estimate engine torque and motor torque.

The inventors have recognized the above issues and have developed a method of controlling hybrid engine torque output comprising: during a transient torque increase responsive to a change in desired powertrain output torque, adjusting engine output torque and motor output torque responsive to the change in desired powertrain output torque, and further adjusting motor output torque in response to a torque converter impeller speed response.

By responding to a torque converter speed response, it may be possible to provide a desired torque converter impeller torque when motor torque and engine torque are varying so that a vehicle driveline does not experience unexpected increases or reductions in driveline torque. For example, motor output torque may be adjusted in response to torque converter speed response so that a desired torque converter impeller torque may be provided even in the presence of engine torque estimation errors. Further, motor torque may compensate for engine torque estimation errors, and an engine torque estimate may be updated or adapted based on an amount of a motor torque adjustment. In this way, a more accurate actual torque converter impeller torque may be provided from a desired torque converter impeller torque.

The present description may provide several advantages. Specifically, the approach may reduce torque disturbances in a vehicle driveline. Further, the approach may improve hybrid vehicle efficiency by allowing the engine and/or motor to operate at design conditions. Further still, the approach may provide some compensation for driveline degradation as the vehicle ages.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
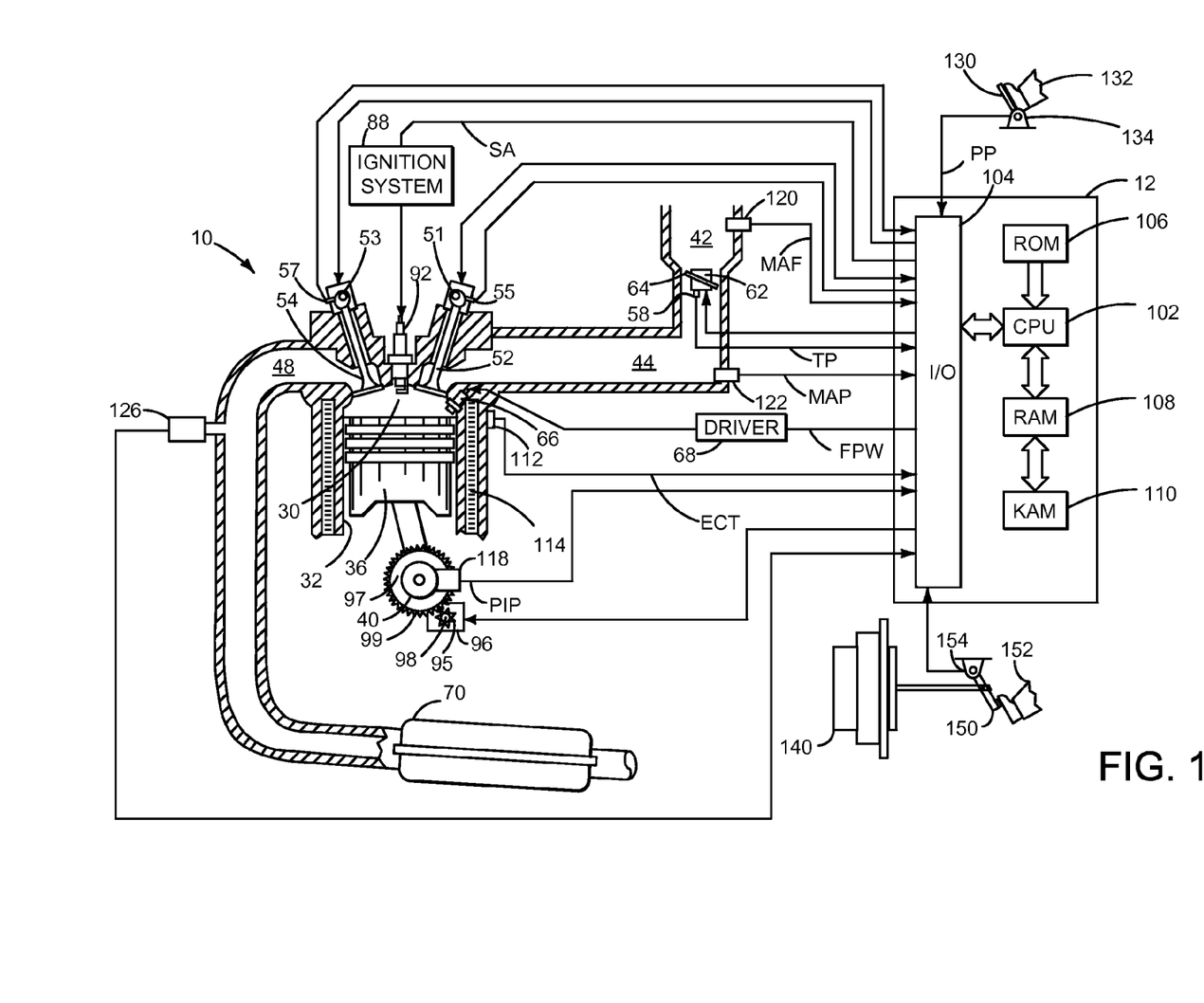
FIG. 1 shows a schematic diagram of an engine.
Figure 2:
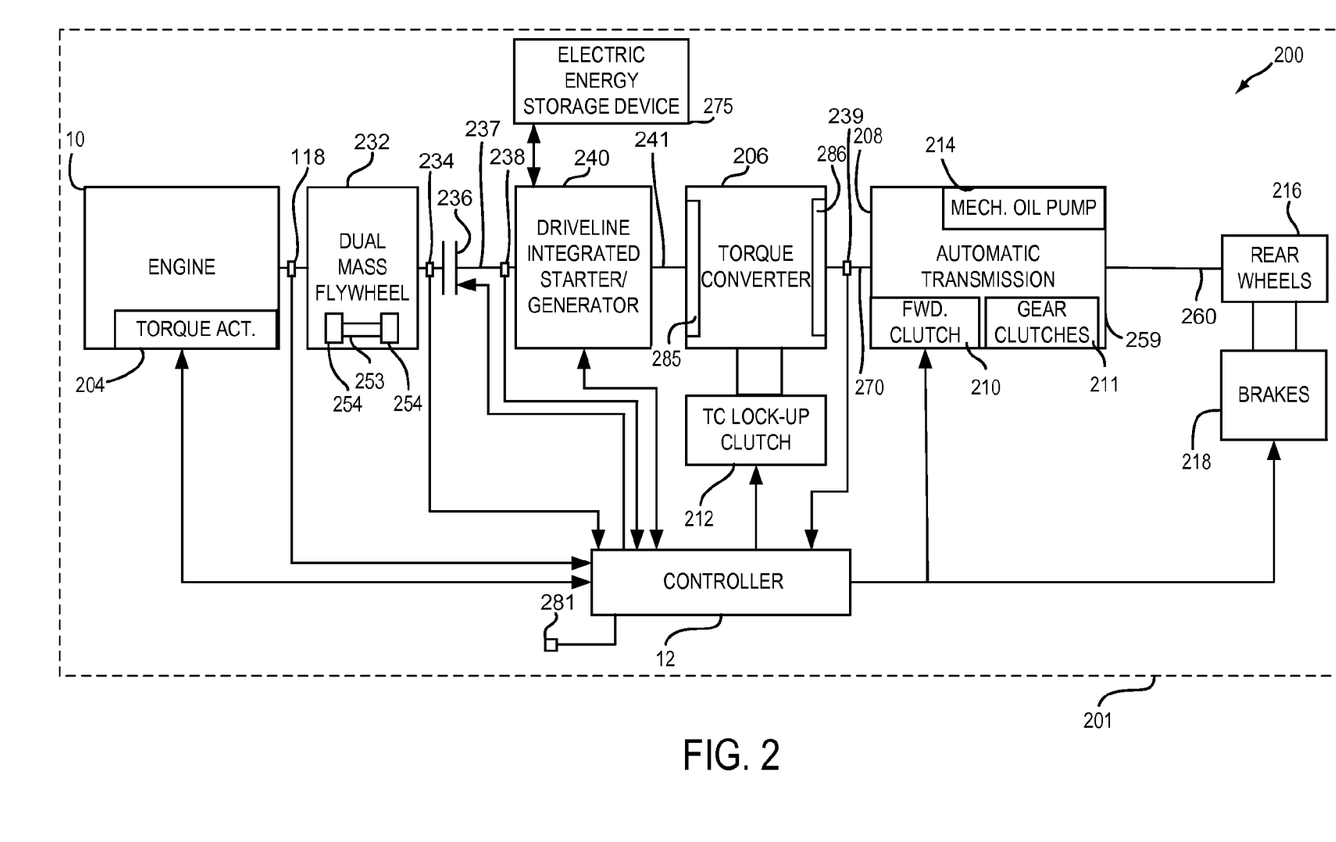
FIG. 2 shows an example hybrid vehicle driveline configuration.
Figure 3:
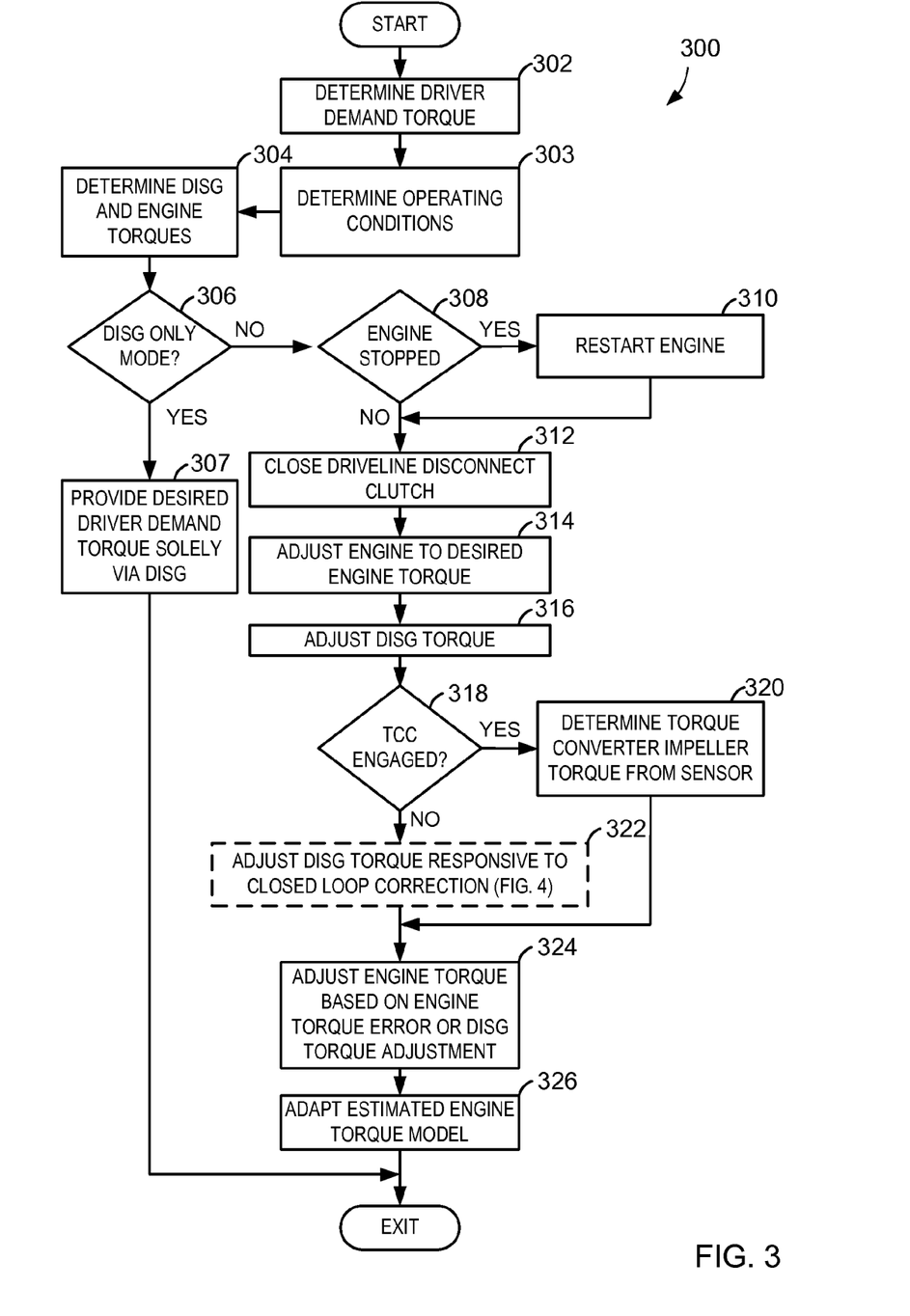
FIG. 3 shows a high-level flowchart for adapting engine torque.
Figure 4:
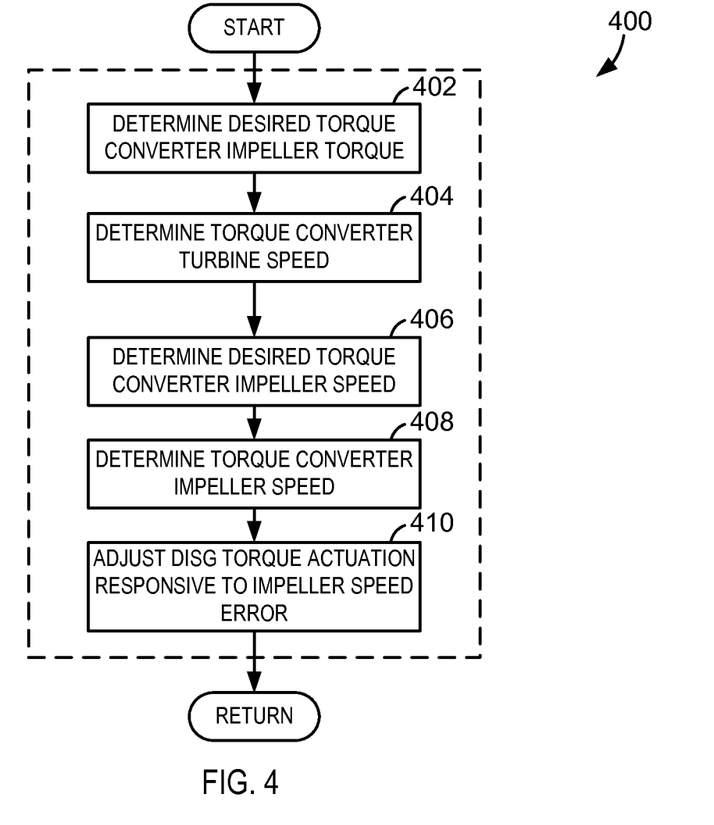
FIG. 4 shows a method for adjusting DISG torque as a way of compensating for engine torque estimation errors.
Figure 5:
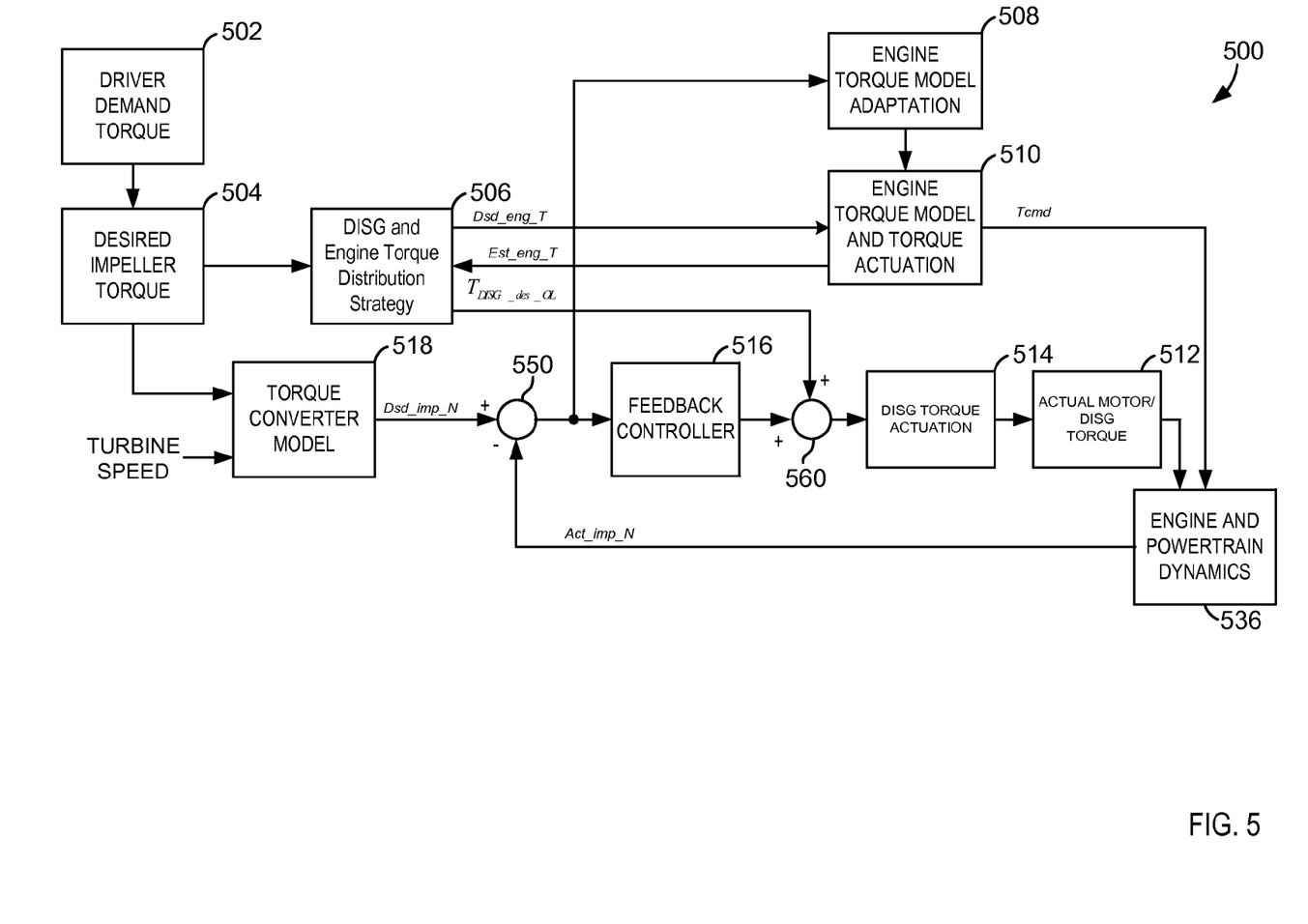
FIG. 5 is a controller block diagram for adapting engine torque.

The present description is related to methods and systems for adapting engine torque and engine torque actuation to provide a desired hybrid vehicle powertrain output torque. The hybrid vehicle may include an engine and electric machine as shown in FIGS. 1-2. The engine and the electric machine may be operated together to provide the desired transmission input torque. Likewise, either the engine or the electric machine may be selectively deactivated such that the engine or the electric machine may be operated alone to provide the desired torque output. As explained in further detail below, the electric machine may be a DISG or driveline integrated starter/generator (DISG) which is integrated into the driveline on the same axis as the engine crankshaft and rotates whenever the torque converter impeller rotates. The DISG may be integrated into the driveline such that the mass and inertia of the DISG remain with the driveline when the DISG is not operating to provide or absorb torque from the driveline. FIGS. 3-5 further illustrate example methods for adjusting the actuation of said DISG and engine torques so as to reduce errors.

Referring to FIG. 1, an internal combustion engine 10 comprises a plurality of cylinders, one cylinder of which is shown in FIG. 1, and is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 (e.g., an exhaust after treatment device). Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 in applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply or engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 may also receive driving surface grade input information from inclinometer 281.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for a hybrid vehicle control system, comprising: an engine; an electric machine; a driveline disconnect clutch positioned in a driveline between the engine and the electric machine; and a controller including executable instructions stored in non-transitory memory to adapt an engine torque estimate in response to a torque converter impeller error. The hybrid vehicle control system further comprises additional instructions for adjusting engine torque in response to an electric machine output torque adjustment. The hybrid vehicle control system further comprises additional instructions for adjusting engine torque based on the engine torque estimate.

In some examples, the hybrid vehicle control system further comprises additional instructions to adjust engine torque via a throttle, valve timing, fuel amount, or spark timing. The hybrid vehicle control system further comprises additional instructions for determining a desired torque converter impeller speed, and where the torque converter impeller error is a torque converter impeller speed error. The hybrid vehicle control system includes where the torque converter impeller error is a torque converter impeller torque error.

Proceeding to FIGS. 3-5, exemplary methods of operating a hybrid vehicle powertrain so as to produce a desired transmission input torque are described. The flowcharts and block diagram of FIGS. 3-5 generally represent operations that may be enabled by hardware and/or software, and as such may be stored as executable instructions in non-transitory memory of a controller 12 as shown in FIGS. 1 and 2. FIG. 3 illustrates an example method 300 in which the DISG may be controlled to produce a desired torque of the vehicle drivetrain during varying driver demand conditions including vehicle acceleration.

At 302, method 300 determines a driver demand torque. The driver demand torque may take the form of desired transmission impeller torque, engine brake torque, wheel torque, or other driveline related torque. In one example, a position of an accelerator pedal is converted into a desired transmission impeller torque via a transfer function that outputs desired torque converter impeller torque when indexed via accelerator pedal position. A change in driver demand torque may be indicative of an increasing accelerator pedal application by the driver, herein referred to as a driver tip-in. Alternatively, a decrease in accelerator pedal application may be referred to as a driver tip-out. Method 300 proceeds to 304 after driver demand torque is determined.

At 303, method 300 may include determining vehicle operating conditions, whether by direct sensor sensing or inference. Operating conditions may include but are not limited to ambient temperature and pressure, engine speed and load, energy storage device state of charge (SOC), vehicle speed, brake pedal position, accelerator pedal position, engine temperature, and the like. Method 300 proceeds to 304 after operating conditions are determined.

At 304, desired engine and DISG torques are determined. In one example where driver demand torque is converted into a desired torque converter impeller torque, the desired torque converter impeller torque is achieved by providing an engine torque and a DISG torque that sum to a value of the desired torque converter impeller torque. The engine torque and DISG torque may be positive or negative depending in the mode of driveline operation. For example, desired engine torque may be positive and DISG torque may be negative when the engine is propelling the vehicle while at the same time charging an energy storage device via the DISG. In some examples the DISG may provide only a fraction of torque that the engine may provide. Consequently, the DISG may operate during low driver demand torque conditions while the engine is off and decoupled from the DISG via the driveline disconnect clutch. Further, DISG operation may be limited based on energy storage device SOC. For example, the DISG may not provide torque to the driveline when energy storage device SOC is less than a threshold. Additionally, the DISG may not absorb driveline torque when the energy storage device SOC is greater than a threshold state of charge. The specific amounts and/or ratio of DISG torque to engine torque that when summed provides the desired torque converter impeller torque may be empirically determined and stored in a map or function that is indexed via vehicle speed, transmission gear, and driver demand torque. The map outputs specific desired amounts of engine torque and DISG torque. Method 300 proceeds to 306 after desired engine torque and desired DISG torque are determined.

At 306, method 300 may further include deciding whether to operate the vehicle in a DISG-only mode. This mode selection may be subject to driver control or may be automatically performed based on vehicle operating conditions. Mode selection may include determining if sufficient DISG output torque is available to provide the desired driver demand torque. If a DISG only mode is selected, the answer is yes and method 300 proceeds to 312 where the DISG is commanded to achieve the desired driver demand torque before method 300 exits. If DISG only mode is not selected, the answer is no and method 300 proceeds to 308.

At 308, method 300 judges whether or not the engine is stopped. The engine may be judged to be stopped when there is an absence of engine rotation. If method 300 judges that the engine is stopped, the answer is yes and method 300 proceeds to 310. Otherwise, the answer is no and method 300 proceeds to 312.

At 310, method 300 restarts the engine. The engine may be restarted by rotating the engine via the starter motor or by closing the driveline disconnect clutch and rotating the engine via the DISG. Spark and fuel may also be supplied to the engine so that the engine combusts air-fuel mixtures. Method 300 proceeds to 312 after starting the engine.

At 312, the driveline disconnect clutch is closed, if it is not already closed, and the engine and DISG are mechanically coupled together. The driveline disconnect clutch may be closed electrically or hydraulically. Method 300 proceeds to 314 after the driveline disconnect clutch is closed.

At 314, method 300 includes commanding engine and motor torque in order to produce a desired torque converter impeller input torque. The desired engine torque represents the amount of torque to be delivered by the engine to the driveline such that when the engine torque is combined with the DISG torque, the desired torque converter impeller torque or desired driver demand torque is provided. The desired engine torque takes into consideration various ambient and vehicle operating conditions and/or modes that may include vehicle speed, engine speed, battery state of charge (SOC), accelerator pedal position, engine coolant temperature, emission control device status, etc. The engine torque may be adjusted via torque actuators including but not limited to valve timing, spark timing, engine fuel amount, fuel injection timing, engine air amount, and exhaust gas recirculation (EGR) amount.

In one example, an engine torque model is provided by a table or function that includes a plurality of stored engine torque values at a plurality of engine speeds and loads (e.g., engine air mass charge divided by a theoretical maximum engine air mass charge). The table is indexed by engine speed and table entries of engine torque are searched at the present engine operating speed to find the table or function location that corresponds to the desired engine torque. The engine load that provides the desired engine torque at the present engine speed is determined by extracting the engine load that corresponds to the table location that provides the desired engine torque at the present engine speed. In other examples, the engine air mass for a particular engine torque at a particular engine speed is modeled via a regression equation. Engine speed, desired torque, spark timing, and other variables are input to the regression equation and engine air mass is output. The engine air mass is converted to a throttle position based on a throttle transfer function. In these ways, engine torque may be adjusted to provide the desired engine torque. Method 300 proceeds to 316 after engine torque is adjusted.

At 316, DISG torque is adjusted. DISG torque represents the amount of torque to be delivered by the DISG to the driveline such that when the DISG torque is combined with the engine torque, the desired torque converter impeller torque or desired driver demand torque is provided. The DISG torque is increased or decreased via adjusting an amount of current and/or voltage supplied to the DISG. When the DISG is operating in a generator mode, the amount of current supplied to a field coil adjusts the amount of negative torque that the DISG applies to the driveline. The DISG torque is adjusted in an open loop mode at 316 to provide the difference between estimated engine torque and desired torque converter impeller torque. For example, if desired torque converter impeller torque is 100 N-m and estimated engine torque is 80 N-m, the desired DISG torque is 20 N-m. Method 300 proceeds to 318 after DISG torque is adjusted.

At 318, method 300 judges whether or not a torque converter clutch (TCC) is engaged. Method 300 may judge that the TCC is engaged when a bit in memory that tracks TCC state is asserted. If the TCC is not engaged, torque converter characteristics may be the basis for correcting engine output torque output and estimated engine torque. If the TCC is engaged the answer is yes and method 300 proceeds to 320. Otherwise, the answer is no and method 300 proceeds to 322, or alternatively to 324 in some examples.

At 320, method 300 determines torque converter impeller torque via a torque sensor positioned at the torque converter impeller. The torque sensor outputs an amount of torque at the torque converter impeller so that the engine torque and/or DISG torque can be adjusted to provide the desired torque converter impeller torque based on the actual torque converter impeller torque. Alternatively, a torque sensor positioned at the torque converter turbine (gearbox input) can be the basis for estimating impeller torque. Further, if a torque sensor is not available, the driveline disconnect clutch may be opened. Method 300 proceeds to 324 after the torque converter impeller torque is sensed and transmitted to a controller, such as controller 12 of FIG. 1.

At 322, method 300 adjusts DISG torque responsive to a closed loop correction as described in further detail in FIG. 4. In other examples, engine torque may be adjusted in response to torque converter impeller speed or torque converter impeller torque as determined by a torque sensor rather than or in addition to adjusting DISG torque. Therefore, 322 may be omitted in some examples. Method 300 proceeds to 324 after DISG torque is adjusted.

At 324, method 300 adjusts engine torque based on engine torque error or based on the DISG torque adjustment depending on the vehicle configuration. Since some vehicles may include a torque converter impeller torque sensor while other vehicles may not, engine torque may be adjusted in several ways.

In one example where the engine includes a sensed or measured torque converter impeller torque, the engine torque error is determined based on the equation:

$$\mathrm{Eng\_Torq\_err} = T\_\mathrm{impeller} - T\mathrm{motor} - \mathrm{impeller\_inertia} \cdot \mathrm{impeller\_acc} - \mathrm{Eng\_Tor\_est}$$

Where Eng_Torq_err is an engine torque error amount, T_impeller is sensed or measured torque converter impeller torque, impeller_inertia is torque converter impeller inertia, impeller_acc is torque converter impeller acceleration as determined from a torque converter impeller speed sensor, and Eng_Tor_est is an estimated engine torque based on engine speed, engine load. In one example, Eng_Tor_est is an engine model based on a table or function that is indexed via engine speed and load or air mass as described at 314. The engine torque output at 314 is adjusted by the engine torque error amount to increase or decrease the engine torque output.

In another example, the engine torque error is determined from a torque converter model. In particular, a function representing torque converter impeller torque is indexed via torque converter impeller speed and torque converter turbine speed. The function outputs empirically determined values of torque converter impeller torque. The engine torque error is determined again by the equation:

$$\text{Eng\_Torq\_err} = T\_\text{impeller} - T\text{motor} - \text{impeller\_inertia} \cdot \text{impeller\_acc} - \text{Eng\_Tor\_est}$$

In still another example, engine torque may be adjusted based on a DISG torque adjustment. In this example, the DISG torque adjustment may be added to the engine so that the engine provides the desired engine torque and so that less capacity of the DISG is continually used. In particular, the additional amount torque provided to the driveline via the DISG is reduced at the DISG and added to the engine. The DISG torque is reduced via reducing DISG current and engine torque is increase via an engine torque actuator such as a throttle, spark timing, valve timing, and/or fuel amount. Method 300 proceeds to 326 after the engine torque or DISG torque is adjusted.

At 326, method 300 adapts an estimate engine torque model based on DISG torque adjustments or the engine torque error. In one example, the engine torque estimate in the table described at 314 is adjusted based on DISG torque or engine torque error. In one example, the DISG torque adjustment is multiplied by a predetermined value and the result is added to the table described at 314 for the particular engine speed and load where the engine torque output resulted in the DISG torque being adjusted to achieve the desired torque converter impeller speed. In another example, a predetermined amount may be added to a value in the table or function described at 314. In other examples where the engine torque is estimated via a regression equation, a coefficient of the regression equation may be adjusted by a predetermined adder or a multiplier. In this way, the base values stored in an engine torque estimation model may be adapted so that errors in engine torque output may be reduced. Method 300 proceeds to exit after the engine torque estimate is adapted.

Referring now to FIG. 4, a method for adjusting DISG torque in response to a closed loop correction is shown. At 402, method 400 determines desired torque converter impeller torque. Desired torque converter impeller torque may be determined from driver demand torque as described at 302. Method 400 proceeds to 404 after desired torque converter impeller torque is determined.

At 404, method 400 determines torque converter turbine speed. Torque converter turbine speed may be determined via a speed sensor as illustrated in FIG. 2. Method 400 proceeds to 406 after torque converter turbine speed is determined.

At 406, method 400 determines a desired torque converter impeller speed. In particular, a torque converter model that takes the form of a table or function outputs empirically determined values of desired torque converter impeller speed after being indexed via torque converter turbine speed and desired torque converter impeller torque. Method 400 proceeds to 408 after desired torque converter impeller speed is determined.

At 408, method 400 determines actual torque converter impeller speed. Actual torque converter impeller speed may be determined via a sensor as shown in FIG. 2. Method 400 proceeds to 410 after actual torque converter impeller speed is determined.

At 410, method adjusts DISG torque in response to the torque converter impeller speed error. In particular, actual torque converter impeller speed is subtracted from the desired torque converter impeller speed to provide a torque converter impeller speed error. The torque converter impeller speed error is operated on by a feedback controller (e.g., a PID, LQR, or other known controller) and output from the feedback controller is added to the open loop DISG torque provided at 316 to adjust DISG torque. In this way, the DISG torque is adjusted to compensate for any engine torque error so that the actual torque converter impeller torque matches the desired torque converter impeller torque. Method 400 returns to 324 after DISG torque is adjusted.

Referring now to FIG. 5, a controller block diagram for adapting engine torque is shown. The controller is one example way to adjust engine torque estimation. At 502, controller 500 determines driver demand torque. Driver demand torque may be determined via reading a position of an accelerator pedal or other input device. Driver demand torque is directed to 504 where it is converted into a desired torque converter impeller torque. In one example a transfer function converts driver demand torque into desired torque converter impeller torque. Desired torque converter impeller torque is directed to 518 and 506.

At 506, method 500 determines how much of the desired torque converter impeller torque is to be provided by the engine. Further, 506 determines how much of the desired torque converter impeller torque is to be provided by the DISG. In one example, the amount of torque provided to the driveline via the DISG and engine is stored in a table of empirically determined values of engine and DISG torque that are indexed based on desired torque converter impeller torque, vehicle speed, and gear. The desired engine torque and desired DISG torque may be further modified to account for energy storage device SOC, engine temperature, and other conditions. Further, the amount of DISG torque may be adjusted in response to the estimated engine torque. For example, the DISG torque may be increased or decreased based on the difference between the desired engine torque and the estimated engine torque. Block 506 outputs open loop DISG ($T_{DISG\_des\_OL}$) and engine torque (Dsd_eng_T) demands to summing block 560 and block 510 respectively.

At 518, method 500 indexes a torque converter model stored as a function or table of empirically determined values of desired torque converter impeller speed. The torque converter model is indexed via the present torque converter turbine speed and the desired torque converter impeller torque. Block 518 outputs a desired torque converter impeller speed (Dsd_imp_N) to summing block 550.

At 510, the desired engine torque indexes and engine torque model as described at 314 of FIG. 3 and block 510 outputs torque actuator adjustments to provide the desired engine torque at engine and powertrain dynamics block 536. The torque actuator adjustments may be throttle commands, valve timing commands, fuel injection timing demands, and/or spark timing commands.

At 536, engine torque output and DISG torque output are combined in the driveline to provide the desired torque converter impeller torque. Driveline dynamics are also within block 536. Driveline dynamics include driveline inertia, response delays, gear mesh, and other conditions that limit the driveline from responding exactly as commanded. The actual torque converter impeller speed (Act_imp_N) is output from block 536 and directed to summing block 550.

At summing block 550, actual torque converter impeller speed is subtracted from desired torque converter impeller speed providing a torque converter impeller speed error. The torque converter impeller speed error is directed to block 516 and block 508. At block 516, a feedback controller (e.g., PID, LQR, or other controller) responds to the desired torque converter impeller speed error and outputs a DISG torque adjustment to summing block 560. The output of summing block 560 is a DISG torque command that adjusts voltage and/or current supplied to the DISG via the DISG torque actuator 514. In one example, the DISG torque actuator may be an inverter. The DISG torque actuator 514 adjusts the torque output of DISG 512. The DISG and engine torque are added to the driveline.

At 508, the engine torque model is adapted in response to the torque converter impeller speed error. In one example, the torque converter impeller speed for a particular impeller speed, which is the same as engine speed and DISG when the driveline disconnect clutch is closed, is multiplied by a factor and the result is added to the engine torque model engine torque estimate for the particular engine speed. Alternatively, the engine torque model estimate may be adjusted by incrementing an engine torque value stored in the engine torque model by a predetermined amount. In still other examples, where the engine torque model is expressed as a regression equation, regression equation coefficients may be adjusted in response to the desired torque converter impeller speed error. Further, the engine torque estimate may be adjusted in response to the DISG command after block 516, if desired.

Thus, the block diagram of FIG. 5 provides for adjusting engine torque and DISG torque in response to a driver demand torque. Further, DISG torque corrects engine torque estimation errors and engine torque estimation errors are adapted based on torque converter impeller speed error.

The methods of FIGS. 3-5 provide for s method of controlling hybrid engine torque output comprising: during a transient torque increase responsive to a change in desired powertrain output torque; adjusting engine output torque and motor output torque responsive to the change in desired powertrain output torque, and further adjusting motor output torque in response to a torque converter impeller speed response. The method includes where the torque converter is unlocked during the transient torque increase. The method further comprises delivering torque output from the torque converter to a multi fixed-gear automatic transmission. The method includes where the motor is a driveline-integrated starter generator (DISG).

In some examples, the method includes where a clutch is located in a drivetrain between the motor and engine, with the clutch engaged during transient torque increase. The method further comprises adjusting engine torque for an engine torque error in response to adjustments of a motor torque. The method further comprises adjusting an estimated engine output torque model based on torque converter impeller speed error. The method includes where adjusting motor output torque includes increasing motor torque in response to a torque converter impeller speed error.

The methods of FIGS. 3-5 also include a method for controlling hybrid engine torque, comprising: supplying an engine torque and a motor torque to a transmission input impeller; adjusting the motor torque responsive to a feedback variable to achieve a desired transmission input impeller speed; and adjusting an engine torque estimate in response to the feedback variable. The method further comprising determining a desired transmission input impeller speed of a torque converter. The method includes where determining the desired transmission input impeller speed further comprises determining a torque converter turbine speed and a desired torque converter impeller torque at the torque converter turbine speed. The method includes where the feedback variable is a difference between a desired torque converter impeller speed and an actual torque converter impeller speed. The method further comprises determining the actual torque converter impeller speed via a sensor. The method further comprises adjusting engine torque in response to the engine torque estimate.

As those of ordinary skill in the art will understand, the functions or steps represented by the block diagram may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, although not explicitly illustrated. In one embodiment, the functions illustrated are primarily implemented by software, instructions, or code stored in a computer readable storage medium and executed by a computer or control module to control operation of the vehicle. Various conventional sensors or actuators are represented generally by corresponding blocks of the Figures.

The invention claimed is:

1. A method for controlling hybrid engine torque output, comprising:
   during a transient torque increase responsive to a change in desired powertrain output torque,
      adjusting engine output torque and motor output torque responsive to the change in desired powertrain output torque, and further adjusting motor output torque in response to a torque converter impeller speed response; and
   adjusting engine output torque for an engine output torque error in response to adjustments of motor output torque.

2. The method of claim 1, where a torque converter is unlocked during the transient torque increase.

3. The method of claim 1, further comprising delivering torque output from a torque converter to a multi fixed-gear automatic transmission.

4. The method of claim 1, where a motor is a driveline-integrated starter generator (DISG).

5. The method of claim 1, where a clutch is located in a drivetrain between a motor and engine, with the clutch engaged during the transient torque increase.

6. The method of claim 1, further comprising adjusting an estimated engine output torque model based on torque converter impeller speed error.

7. A method for controlling hybrid engine torque output, comprising:
   during a transient torque increase responsive to a change in desired powertrain output torque,
      adjusting engine output torque and motor output torque responsive to the change in desired powertrain output torque, and further adjusting motor output torque in response to a torque converter impeller speed response, where adjusting motor output torque includes adjusting motor torque in response to a torque converter impeller speed error, the torque converter impeller speed error based on a difference between a desired impeller speed and a measured impeller speed.

8. The method of claim 7, where a torque converter is unlocked during the transient torque increase.

9. The method of claim 7, further comprising delivering torque output from a torque converter to a multi fixed-gear automatic transmission.

10. The method of claim 7, where a motor is a driveline-integrated starter generator (DISG).

11. The method of claim 7, where a clutch is located in a drivetrain between a motor and engine, with the clutch engaged during the transient torque increase.

12. The method of claim 7, further comprising adjusting engine torque for an torque error in response to adjustments of a motor torque.

13. The method of claim 7, further comprising adjusting an estimated engine output torque model based on the torque converter impeller speed error.

* * * * *